United States Patent [15] 3,697,605
Watanabe et al. [45] Oct. 10, 1972

[54] PROCESS FOR PRODUCING ALCOHOLS

[72] Inventors: Masami Watanabe, Tokyo; Keishi Namikawa, Ageo; Kotaro Yasuda; Motoyoshi Takagi, both of Toda, all of Japan

[73] Assignee: Nippon Mining Co., Ltd.

[22] Filed: April 19, 1968

[21] Appl. No.: 722,575

[30] Foreign Application Priority Data

April 22, 1967 Japan..................42/25419

[52] U.S. Cl.................260/618 H, 252/468, 252/476
[51] Int. Cl.........................C07c 33/00, C07c 29/00
[58] Field of Search...............................260/618 H

[56] References Cited

UNITED STATES PATENTS

| 2,079,414 | 5/1937 | Lazier | 260/618 H |
| 2,091,800 | 8/1937 | Adkins et al. | 260/618 H |
| 2,137,407 | 11/1938 | Lazier | 260/618 H |
| 2,400,959 | 5/1946 | Stewart | 260/618 H |
| 3,213,145 | 10/1965 | Field | 260/618 H |

OTHER PUBLICATIONS

Connor et al., Jour. Amer. Chem. Soc., Vol. 53 (1931) page 2012

Mozingo et al., Jour. Amer. Chem. Soc., Vol. 70 (1948) pages 229–231

*Primary Examiner*—Bernard Helfin
*Attorney*—Robert E. Burns and Emmanuel J. Lobato

[57] ABSTRACT

A process for the reduction of esters of aromatic carboxylic acids with hydrogen in the presence of a copper-containing catalyst to the corresponding aromatic alcohols is provided wherein the copper-containing catalyst is composed of copper oxide and oxides or carbonates or oxide-carbonate mixtures of one or more alkaline earth metals selected from the group consisting of magnesium, calcium, strontium and barium, the copper being present in an amount of 0.01 to 3 atoms per atom of alkali metal. Reduction is effected at a temperature above 80° C. and at a pressure higher than 60 kg./cm.$^2$. If desired, chromium is added to the catalyst in an amount of at least about 0.01 atom per atom of copper contained in the catalyst.

1 Claim, No Drawings

PROCESS FOR PRODUCING ALCOHOLS

BACKGROUND OF THE INVENTION

The present invention relates to a method of reducing esters of aromatic carboxylic acids to the corresponding alcohol. In particular the invention concerns the reduction of alkyl esters of aromatic carboxylic acids, with hydrogen in the presence of a copper-containing catalyst to the corresponding aromatic methyol compound.

The term, aromatic carboxylic acid ester, as used herein denotes aromatic compounds wherein a carboxylic acid ester group is attacked directly to the aromatic nucleus.

Aromatic alcohols, i.e. hydroxymethyl-substituted aromatic compounds have hitherto been produced commercially by first chlorinating aromatic hydrocarbons of the formula $ArCH_3$, wherein Ar is an aromatic group, to the corresponding aromatic chlorides of the formula $ArCH_2Cl$, then dehydrochlorinating the latter. The aromatic alcohols thus produced are expensive and usually contain a small amount of chloride which must be removed for certain special uses.

It is known that esters of carboxylic acids can be reduced with hydrogen at high pressure to the corresponding alcohols in the presence of the copper-containing catalysts as has been discovered by Homer Adkins and his co-workers. These catalysts are particularly useful at temperatures of 200° to 300° C. and at a hydrogen pressure of 175 to 300 atmospheres for reducing esters of aliphatic acids to the corresponding aliphatic alcohols, or reducing esters of aryl substituted aliphatic acids such as phenyl substituted propionic, butyric and higher aliphatic acids to phenyl substituted propyl, butyl, etc. higher alcohols in relatively high yields. However, the copper-containing catalysts proposed by Adkins and his co-workers are not as satisfactory for reducing esters of the formula ArCOOR to the corresponding alcohols of the formula $ArCH_2OH$, wherein Ar is an aromatic group and R is an alkyl hydrocarbon group.

The main difficulty with these catalysts is that they are not sufficiently selective. The reduction of esters of the aromatic carboxylic acids results in a high conversion to the corresponding hydrocarbon; i.e., the carboxyl group is reduced all the way to a methyl group rather than to a —$CH_2OH$ group. It has been proposed to minimize the reduction of the carboxyl group to a methyl group by employing a large amount of catalyst and by the use of lower temperatures of about 150° to 180° C.. Mozingo and Folkers have been able to reduce ethyl benzoate to yield 63 percent of benzyl alcohol and 37 percent of toluene by using copper chromite having an atomic ratio of Cu:Ba:Cr=0.9: 0.1: 1.0 at a temperature of 125° C., and at a hydrogen pressure of 300 kg./cm.$^2$ (J. Am. Chem. Soc. 70, 229 (1948)). More recently Edmund Field disclosed a process in which alkyl esters of benzoic acid can be reduced with hydrogen in the presence of a copper chromite type catalyst promoted with a small amount of manganese to yield more than 80% of benzyl alcohol (U.S. Pat. No. 3,213,145 (1965)). The copper-containing catalysts hitherto developed are still not effective particularly with respect to selectivity for the reduction of the esters of aromatic carboxylic acids to the corresponding aromatic alcohols.

SUMMARY OF THE INVENTION

The principal object of this invention is to provide a process in which aromatic alcohols of the type hereinbefore mentioned can be produced more economically than in conventional processes.

A specific object of the present invention resides in the hydrogenation of the esters of aromatic carboxylic acids wherein the carboxylic acid group is connected directly to the aromatic nucleus to the corresponding aromatic methylol compounds in the presence of a copper-containing catalyst.

A further object is to provide a process for obtaining aromatic methyol compounds which contain substantially no chlorides and no aldehydes.

Another object of the present invention is to provide a highly efficient hydrogenation catalyst for the above process.

A novel catalyst having a high selectivity has been discovered, in the presence of which, alkyl esters of aromatic carboxylic acids are reduced to the corresponding hydroxymethyl-substituted aromatic compounds in high yield, without substantial production of hydrocarbon, namely, the corresponding methyl substituted aromatic compound.

It has been found that a copper-containing catalyst in which copper oxides are supported on oxides, carbonates or oxide carbonate mixtures of one or more metals selected from the group of magnesium, calcium, strontium and barium reduces alkyl esters of arylcarboxylic acids selectively to the corresponding aryl alcohols. This catalyst contains from 0.01 to 3.0 atoms of copper per atom of metal found in the above mentioned support.

This catalyst is active at temperatures above 80° C. and is especially useful at temperatures in the range of 100° to 300° C., depending on the method used for carrying out a given reaction and the catalyst composition selected.

This catalyst is used at the hydrogen pressures of above 60 kg./cm.$^2$. The maximum pressure which can be used depends solely upon the strength of the reaction apparatus.

DESCRIPTION OF THE PREFERRED EMBODIMENTS

By employing the novel catalyst at preferred reaction conditions, for example, benzyl alcohol can be produced from alkyl benzoates in yields above 95 mol percent, with practically no concomitant formation of toluene.

This invention is based on the discovery that a copper containing catalyst is highly selective for the reduction of the esters of aromatic carboxylic acids to the corresponding aromatic methyol compound only when it is supported by oxides or carbonates or oxide-carbonate mixtures of one or more metals selected from the group of magnesium, calcium, strontium and barium, and that without these supports the copper-containing catalyst is neither active nor selective for the above-mentioned reaction. The unique function of the present supports can be further understood by the following results. When a copper-containing catalyst is supported by other catalyst supporting materials such as clay, silica, alumina or silica-alumina instead of the supports hereinbefore specified only 3 to 7 mol percent of benzyl alcohol and 93 to 97 mol percent of toluene are obtained by reduction of ethyl benzoate.

According to the present invention, the new highly selective catalyst contains about 0.01 to 3 atoms, and most preferably 0.05 to 1.0 atom of copper per atom of metal in the support. Another feature of this invention is that the present selective catalyst may be further promoted by the addition of chromium oxide. Thus the present catalyst may contain additionally 0.01 atom of chromium per atom of copper; the amount of chromium oxide preferably used is 0.1 to 1.0 atom of chromium per atom of copper.

Aromatic carboxylic acid esters which are reduced according to the present invention include alkyl esters of aromatic carboxylic acids wherein the carboxylic acid ester group is attached directly to an aromatic hydrocarbon nucleus. The aromatic hydrocarbon nucleus may be for example, a benzene nucleus, a condensed aromatic system such as naphthalene, or an alkyl or aryl hydrocarbon substituted aromatic nucleus. The ester group may be any alkyl hydrocarbon. From an economic standpoint, the ester is preferably a lower alkyl group such as methyl, ethyl, n-propyl, isopropyl or n-butyl; however, higher alkyl esters such as dodecyl, cetyl or stearyl groups may be used if desired. It is a characteristic of the present invention that the new process can be applied not only for the reduction of esters of aromatic monocarboxylic acids but also for the reduction of esters of aromatic polybasic carboxylic acids. Some examples of aromatic carboxylic acid esters which may be reduced to the corresponding hydroxymethyl substituted aromatic compounds according to the present invention include methyl benzoate, butyl benzoate, ethyl naphthoate, diethyl phthalate, ethyl m-propylbenzoate, methyl p-phenylbenzoate, methyl p-methylbenzoate, and diethyl terephthalate.

It is known that esters of aromatic carboxylic acids can be reduced with hydrogen in the presence of nickel catalysts to esters of cycloparaffinic carboxylic acid. It is another characteristic of the present invention that the novel catalyst never reduces the aromatic ring unsaturation.

Another characteristic of this invention lies in the easiness of the preparation of the catalyst. The precise method for combining the necessary metal components of the copper-containing catalyst is not critical. Any method already known to the art for combining the metal components of the catalyst may be employed.

The copper-containing catalyst can be conveniently prepared, for example by impregnating magnesium oxide with a copper nitrate water solution. Chromium also may be added into the water solution as chromium nitrate at the same time. The resulting impregnated magnesium oxide is dried and then calcined. The copper and also the chromium can of course be incorporated with the support in thermally decomposable forms other than nitrates. Another method for preparing the catalyst may be to knead a support with the proper amounts of thermally decomposable copper compounds, and if desired, chromium compounds and sufficient water to make a uniform, thick paste. The mixture is dried and calcined. Also the metals can be combined by a usual coprecipitation method in which suitable ratios of copper, chromium and other metals are present in an acidic solution and precipitated with addition of a basic solution.

The mixture of metals is calcined at a temperature above 300° C. to provide the catalyst, temperatures in the range of 400° to 600° C. are preferable, and calcination above 900° C. usually reduces the activity of the catalyst. It is natural that the activity of the novel catalyst should diminish during use, but the initial activity of the catalyst can be completely restored by simply calcining the used catalyst at temperatures higher than 400° C. in air.

The catalyst of this invention can be utilized in the reduction of esters of aromatic carboxylic acids in many forms or shapes. The process of this invention can be carried out by dispersing the catalyst in a finely-divided form in the ester in the liquid phase. However, by carrying out the reaction in a solvent, especially in alcohol, the rate and selectivity of the reduction is enhanced. Suitable reaction solvents are saturated aliphatic alcohols, and preferably the alkanols corresponding to the alcoholic by-product split off from the ester group. By employing the alcoholic by-product which splits off during the reduction, the separation and recovery of the product may be simplified.

The ester reduction process of this invention can be carried out in a batch process or in a continuous flow system which is more suitable for commercial application of the process. For example, in countercurrent contact in a tower packed with catalyst pellets, the solvent ester solution may be charged to the top and hydrogen to the bottom.

EXAMPLES

The following examples are set forth for the purposes of illustrating the best modes contemplated for carrying out the present invention but they must not be construed as limiting the invention in any manner whatsoever.

EXAMPLE 1

A catalyst was prepared as follows:

0.5 mol of magnesium nitrate, 0.3 mol of copper nitrate and 0.06 mol of chromium nitrate were dissolved in 600 ml. of water and mixed at ordinary temperature with 900 ml. of water containing 1.1 mol of sodium carbonate with stirring. The precipitate was washed with water, dried then calcined at 500° C. in the air for 5 hours. The catalyst prepared here had an atomic ratio of Mg: Cu: Cr = 60:60:12.

To a hundred ml. stainless autoclave, 2 g. of the catalyst prepared as above, 50 ml. of ethanol and 0.05 mol of ethyl benzoate were introduced. Air was purged from the autoclave which was then pressurized to 110 kg./cm.$^2$ with hydrogen. The autoclave contents were heated to and maintained at 150° C. with shaking. A sample taken after 45 minutes for gas chromatographic analysis showed 61 percent conversion of the ester of which 60 percent was benzyl alcohol and 1 percent was toluene.

Thus, the benzyl alcohol yield was 99 percent.

EXAMPLE 2

A catalyst was prepared as follows:

0.05 mol of copper nitrate was dissolved in 500 ml. of water and mixed with 1.0 mol of magnesium oxide powder. The mixture was kept at ordinary temperature for 20 hours. The precipitate was recovered by filtration, dried, then calcined at 500° C. in the air for 5 hours. The reduction of Example 1 was repeated except that 2 g. of the above catalyst was used and the reaction temperature was 130° C.. The conversion of 38 percent in 2 hours with a yield of benzyl alcohol of 100 percent was obtained.

EXAMPLE 3

A catalyst prepared as follows:
0.04 mol of copper nitrate was dissolved in 500 ml. of water and mixed with 0.2 mol of calcium hydroxide.

The mixture was kept at ordinary temperature for 20 hours. Then the precipitate was recovered by filtration, dried, then calcined at 800° C. in the air for 5 hours.

The reduction of Example 1 was repeated except that 2 g. of the above catalyst was used and the reaction temperature was 140° C.. The conversion of 34 percent in 2 hours with a yield of benzyl alcohol of 88 percent was obtained.

EXAMPLE 4

A catalyst was prepared as follows:
0.25 mol of magnesium nitrate, and 0.05 mol of copper nitrate, and 0.01 mol of barium nitate were dissolved in 400 ml. of water, and mixed with equal volume of water containing 0.36 mol of sodium carbonate with stirring. The precipitate was washed with water, dried, then calcined at 400° C. in the air for 5 hours.

The reduction of Example 1 was repeated except that 2 g. of the above catalyst was used. The conversion of 38 percent in 2 hours with a yield of benzyl alcohol of 98 percent was obtained.

EXAMPLE 5

The process of Example 4 was repeated except that strontium nitrate was used instead of barium nitrate.

Conversion of the ester was 33 percent with a yield of benzyl alcohol of 100 percent.

EXAMPLE 6

The process of Example 4 was repeated except that calcium nitrate was used instead of barium nitrate. Conversion of the ester was 29 percent with a yield of benzyl alcohol of 100 percent.

EXAMPLE 7

A catalyst was prepared as follows:
0.2 mol of strontium nitrate and 0.08 mol of copper nitrate were dissolved in 250 ml. of water and mixed with 600 ml. of water containing 0.31 mol of sodium carbonate with stirring. The precipitate was washed with water, dried and calcined at 350° C. in the air for 5 hours.

The reduction of Example 1 was repeated except that 2 g. of the above catalyst was used. The conversion of 25 percent in 2 hours and a yield of benzyl alcohol of 99 percent was obtained.

EXAMPLE 8

The process of Example 1 is repeated except that p-toluic acid ethyl ester was used instead of ethyl benzoate. Conversion of the ester was 54 percent with a yield of p-methylbenzyl alcohol of 100 percent.

EXAMPLE 9

The process of Example 1 is repeated except that 0.025 mol of diethyl terephthalate is used instead of ethyl benzoate. Gas chromatographic analysis of the reaction product showed 67 percent conversion of the ester, of which 47 percent was p-xylylene glycol and 18 percent was p-hydroxymethyl-benzoic acid ethyl ester.

It will be apparent to those skilled in the art that many modifications may be made in embodying the process of the present invention and that a great variety of alkyl esters of aromatic carboxylic acids may be reduced thereby, and all such obvious modifications are included within the scope of the present invention.

What we claim and desire to secure by letters patent is:

1. A process for the reduction of alkyl esters of aromatic carboxylic acids to the corresponding aromatic methylol compound without substantial reduction of the carboxyl group of said ester to a methyl group, which comprises reducing said aromatic carboxylic acid ester with hydrogen at a temperature of about 80° C. to about 300° C. and a pressure higher than 60 kg./cm.$^2$ in the presence of an alkanol solvent and a catalyst consisting essentially of copper oxide, chromium oxide and at least one member of the group consisting of magnesium oxide and magnesium carbonate, said catalyst containing 0.01 to 3.0 atoms of copper per atom of magnesium and 0.01 to 1.0 atoms of chromium per atom of copper.

* * * * *